May 18, 1965   W. B. SMITH, JR   3,184,716
GUARDED TONE SIGNALLING
Filed April 20, 1961   12 Sheets-Sheet 1

INVENTOR.
WILLIAM B. SMITH, JR.
BY
Robert J. Killman
ATTORNEY

INVENTOR.
WILLIAM B. SMITH, JR.

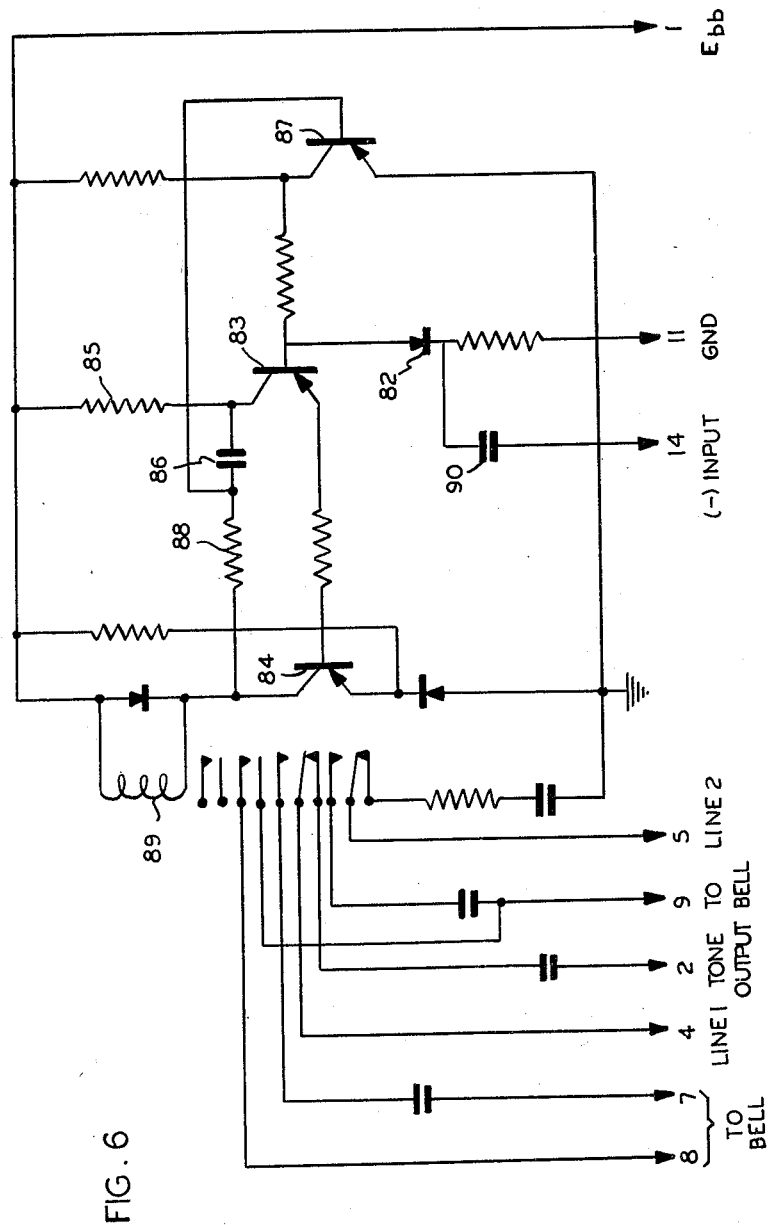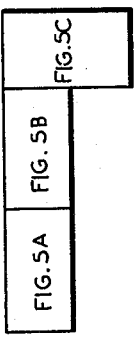

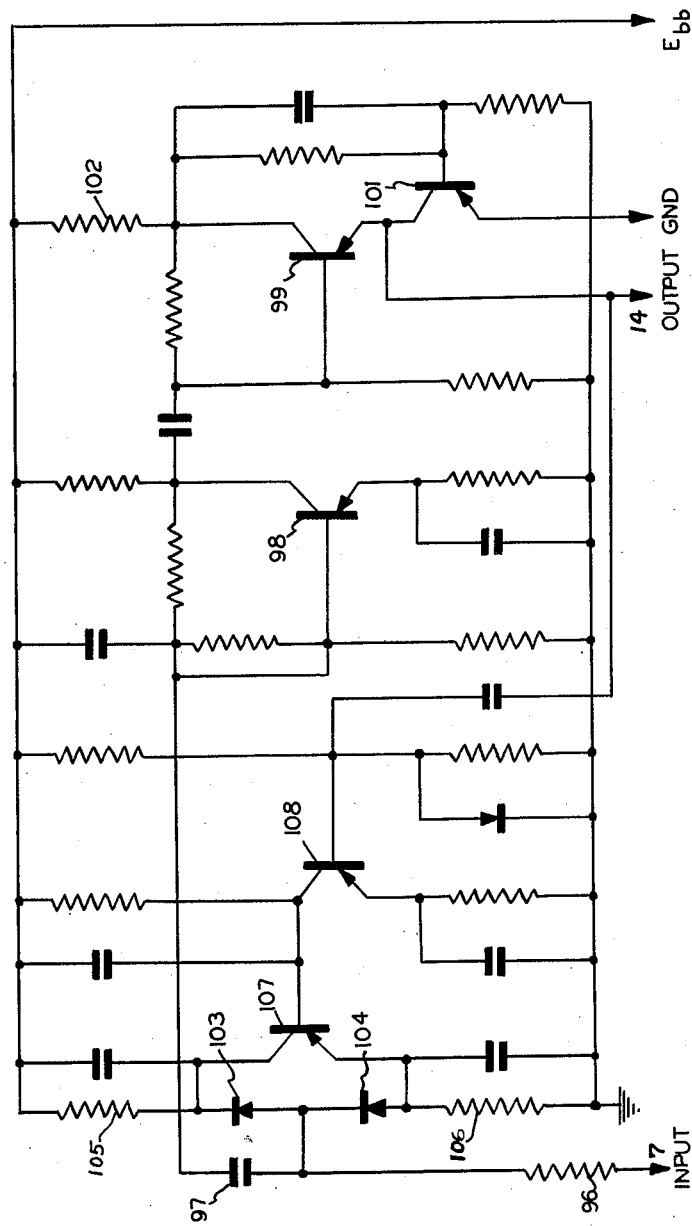

INVENTOR.
WILLIAM B. SMITH, JR.
BY Robert J. Killman
ATTORNEY

May 18, 1965 W. B. SMITH, JR 3,184,716
GUARDED TONE SIGNALLING
Filed April 20, 1961 12 Sheets-Sheet 9

INVENTOR.
WILLIAM B. SMITH, JR.
BY
*Robert J. Killman*
ATTORNEY

May 18, 1965 W. B. SMITH, JR 3,184,716
GUARDED TONE SIGNALLING
Filed April 20, 1961 12 Sheets-Sheet 10

*INVENTOR.*
WILLIAM B. SMITH, JR.
BY
Robert T. Killman
ATTORNEY

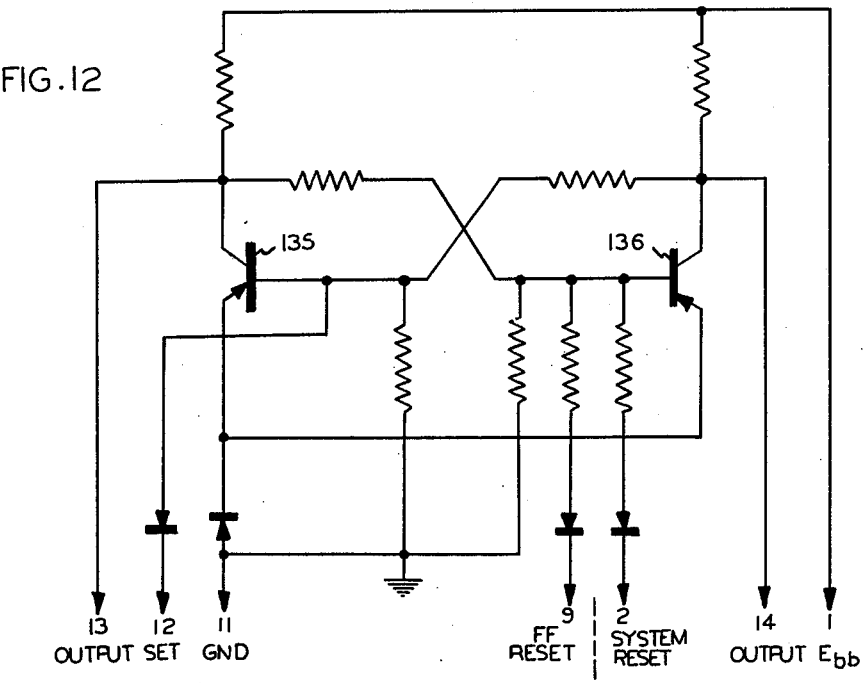
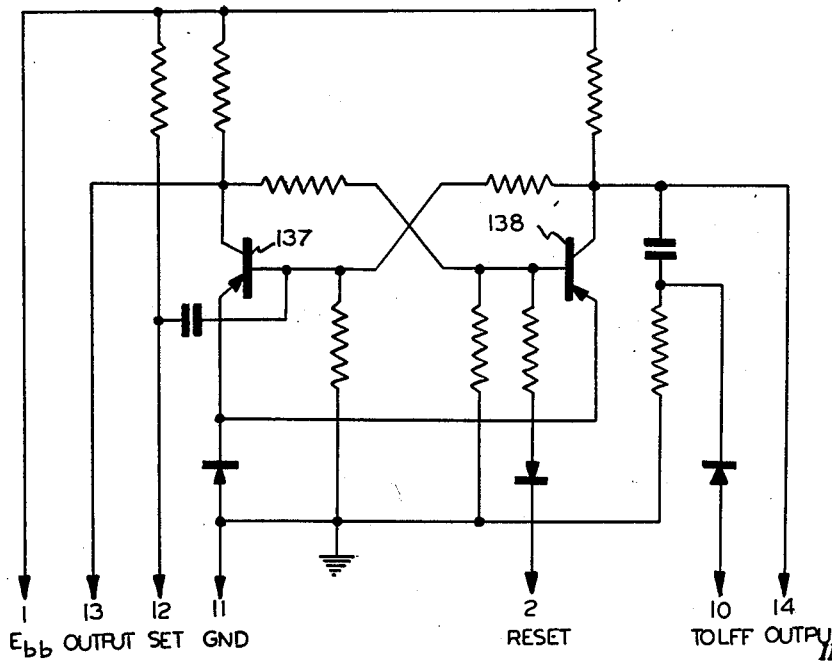

May 18, 1965 W. B. SMITH, JR 3,184,716
GUARDED TONE SIGNALLING
Filed April 20, 1961 12 Sheets-Sheet 12

*INVENTOR.*
WILLIAM B. SMITH, JR.
BY
Robert T. Killman
ATTORNEY

United States Patent Office 3,184,716
Patented May 18, 1965

3,184,716
GUARDED TONE SIGNALLING
William B. Smith, Jr., Baltimore, Md., assignor to The Bendix Corporation, Towson, Md., a corporation of Delaware
Filed Apr. 20, 1961, Ser. No. 104,360
14 Claims. (Cl. 340—171)

This invention relates generally to tone signalling systems, and more particularly to systems which employ a plurality of simultaneous tone transmissions for formulating code characters corresponding to the intelligence to be transmitted.

Various arrangements of tone code signalling systems have been provided in the past where they have been applied to existing voice communication circuits to extend the usefulness of such circuits or adapt them for additional service. Systems of this type generally employ tones which are in the audio range in order that the code communication system will be compatible with the transmission characteristics of the voice circuit to which it is applied.

One of the problems which must be satisfactorily solved in a tone code communication system employing voice transmission circuits is the provision of some means to assure that the code responsive apparatus does not respond to voice generated tone frequencies of the same combination employed for the tone code signalling to produce a false code response. Since the tone codes employ frequencies in the audio range, the use of mere frequency discrimination to eliminate responses to voice frequencies that may be on the line is not available as a practical solution to this problem. To overcome this difficulty, the prior art tone code signalling systems have relied upon the transmission of a fixed number of tones to represent each character in a message or the transmission of a pair of tones in predetermined timed sequence to represent each character, or other arbitrary limitations on the formulation of the code to represent the characters to be transmitted in order that the probability of that particular combination of tones being present from voice frequencies on the line might be minimized. As a consequence of this approach, however, the number of tones required for transmitting a given number of code characters is always greater than would be necessary if a code were formulated without restriction from a given number of available tones.

For example, in an ordinary long distance telephone code tone signalling system, a set of five distinct tones may be employed using either two tones or three tones at a time to provide the ten digits of a dialed number which it is necessary to transmit. If the tone signalling system were not limited by considerations of reliability to restrict the transmission to a predetermined number of simultaneous tones, the information necessary to transmit the ten digits could be accomplished with only four available tones and in addition, there would be four useful combinations of tones left over which could be employed for supervisory or remote operation functions.

The disparity between the information capacity of codes formulated with and without the above-mentioned restrictions diverges rapidly as the number of available tones is increased to provide a greater number of possible tone characters. For example, using seven distinct tones, the maximum number of characters which can be transmitted with any predetermined number of tones in the code is 35 characters, whereas a seven-tone code formulated without limit as to the number of tones required to transmit a particular character provides a total of 126 characters, not including all tones or none, which can be transmitted with combinations of the seven tones. Thus, systems which are arranged to use all combinations of the available tones represent the maximum economy in both equipment and cost since the necessity for additional tones entails additional expense at both the transmitting and receiving end of the system.

Although many other proposals are known, in practice signalling circuits established over channels which carry other kinds of information (such as speech) are almost always based on sequential tone pairs. Tones are generally selected from a set whose frequencies are determined by multiplication of a set of sequential odd numbers by a common multiplier, so that the sum or difference of any pair will be an even number in the set, and hence, less likely to excite a false response. Aside from the fact that this safeguard is most effective with pairs of tones, the use of pairs is also a compromise between the susceptibility to false operation of a system responsive to single tones and the degradation of signal to noise ratio which occurs as the number of simultaneous tones is increased. Since a system responsive to tone pairs is still responsive to false excitation by speech or other signals occurring in the same channel, other safeguards and compromises are necessary. For example, the selectivity and response time of the system is increased as much as is technically and economically feasible, usually by adoption of vibrating reed selective responders which provide a very high Q, in the order of several hundred. A penalty is paid for this in that the resonant frequency of a reed rises with increase in amplitude, especially when fitted with electrical contacts, so that a reed excited by a tone may be sustained by application of the next higher tone and give a false response. As a further safeguard, the response level of the selective responders is set as high as the vagaries of generators, responders and communication links will permit, usually being of the order of 0.8 part of the designed equilibrium level of the responder. This adds quite materially to the cost and maintenance problems of the system, and, in common with the previously mentioned safeguards, increases the time required for reliable recognition of a signal.

In the present system the low probability that all the tones of a space code will be simultaneously present in a voice signal is utilized to realize many advantages not heretofore contemplated. Since the probability of the occurrence of four simultaneous tones is low the integration time necessary to recognize the tone group can be correspondingly lowered and the present invention can therefore be operated with low Q circuits of the order of twenty or thirty. Hence the information rate of the present system is an order of magnitude faster than previously obtained in tone code systems.

It is apparent that more tones are required to make up a set of pairs of tones than would be required to make up a set of combinations where the number of simultaneous tones is variable. Also, as for example in an airway selective calling system, it is not feasible with a tone-pair code to communicate in immediate succession two identical digits or two digits having a common tone or to use adjacent tones in any digit. As a result of this lack of flexibility, a two digit selective calling system using pairs of twelve tones will provide only about 1442 useful combinations instead of the 4290 calls one might expect. To obtain complete freedom in choice of successive characters the number of available tones may be increased in accordance with a variety of proposals, but to the present time this is known to have been practiced only in telephone service, where each generator set serves so many subscribers that its cost is an insignificant factor.

One known system which has not been adopted in commercial practice is disclosed in the patent to Clos, No. 2,470,145. In the system there disclosed, a tone-pair code or a tone-triplet code is transmitted by means of five audio tone frequencies which are continuously transmitted during a message and the appropriate tone-pair or tone-triplet combination is achieved by interrupting three or two of the tones. In the operation of the system, the number of tones in a code character is selected at the sending end and the transmission of the first tone character embodying either two or three tone interruptions establishes that predetermined number as the number of tone interruptions which must be recognized at the receiving end before a character can be recognized. The system thus operates first to respond to the cessation of the tones which constitute a character and upon recognizing the receipt of a complete character as determined by the fixed number of tones in characters for the code system adopted, initiates readout of a relay tree to set a register for recording the particular character received. The system is thus limited to the transmission of a relatively small number of characters for any given number of tones available in the system. The operating speed is relatively slow by virtue of the sequential nature in which the receipt of tones is first responded to, then checked for correctness and ultimately established in the register.

The Clos system is further limited in its operating speed by virtue of being adapted to conventional tone signalling systems for telephone service in which high-Q band pass filters and linear transmission is employed. In such conventional tone systems, linear amplification and the high-Q band pass filters are employed to enhance the reliability of the system and prevent false response to spurious tones which may appear momentarily on the line. Concomitantly a penalty of slowing the speed of response is carried since the Q of the band pass filter will directly determine the response rise time when a signal at the filter frequency midband is applied thereto. Similarly, where band pass filters are employed in an energized state and are required to become de-energized after the cessation of signal input, the high-Q nature of the circuit will continue to provide output for a considerable period of time after signal input ceases.

Furthermore, systems requiring the recognition of a code character consisting of a fixed number of tones prior to sampling the tone relay tree preclude the possibility of utilizing a response characteristic of resonant circuits upon decay of the signal level therein which the present invention utilizes to achieve higher signalling speeds with lower probable error than heretofore considered possible in tone code systems. Merely increasing the speed of equipment response in a tone code system using a code limited to simultaneous drop-out of a fixed number of tones produces a further difficulty due to the different time delays the different tone frequencies experience in the transmission medium. Thus where three tones drop out to formulate code characters a delay in one tone frequency would operate the error alarm since high speed equipment would have recognized a two tone drop out prior to the third tone termination.

The present invention accomplishes a significant improvement over the previously practiced tone combination systems by adopting a set of tones, usually the minimum number required to provide the desired number of combinations between none and all tones, and transmitting all tones as a positive space combination preceding any other combination. Thus, continuity of transmission followed by cessation of all tones in the group, for a period adapted to the communication medium, to mark the end of the message assures message unity. The characters of the message or call are transmitted in succession by interrupting momentarily one or more of the tones in unique combinations, the transmission of all tones of the group continuing between characters. At the responder the outputs of circuits selectively responsive to each of the tones are sampled an instant after the interruption of any tone, i.e. at the end of a space code, to determine what character was transmitted. There will be $2^n-2$ available combinations in a set of $n$ tones, so four tones will serve a decimal system with four codes left for function orders or to pair with digits in a forty character system, while five tones will serve a teleprinter on a one-for-one basis.

Since tone signals are transmitted usually as an alternate to speech in a common system, false operation due to speech would require that all space tones appear in the speech simultaneously and then some but not all be discontinued. If the frequency spacing between adjacent tones is made greater than the lower frequency limit of the channel and the tones are otherwise not harmonically related, or are harmonically related to a frequency below this lower limit, the probability that this will occur at significant amplitude becomes so remote as to be essentially nonexistent. Even this remote event would interrupt the signal character for only a few milliseconds, so it would recover before any message or call following the speech could be initiated.

Where other systems known to be practiced sample a signal at the selective responder while its response is rising exponentially toward a somewhat uncertain equilibrium value, the system according to this invention samples while the response is declining exponentially toward an equilibrium value which is essentially zero, and consequently sampling occurs at a much more certain level. In a system designed to cope with the different characteristics of wire, carrier and radio links in their various forms and combinations, sampling may be carried out earlier after the end of the space and with much greater reliability in the system according to the invention by relying upon the greater stability of the zero reference.

Since the positive space comprising all tones in use occurs between all code characters, there is no restriction on the choice of successive characters, and any arbitrarily chosen sequence of characters in a message can be used.

In a linear system having a fixed peak signal amplitude capacity, the total signal power will vary inversely with the number of simultaneous tones $n$ (each of equal amplitude). This follows from the fact that the amplitude of each tone is $e_0/n$, the power level of each is $k(e_0/n)^2$ and the total power is $nk(e_0/n)^2=ke_0/n^2$. Each doubling of $n$ reduces the total signal power by 3 db and reduces the power at each signal frequency by 6 db. In any change of the number of tones, the change in level of individual tones is twice as great as the change in total signal power when expressed in db.

With respect to signal energy, a four-tone system according to the present invention would appear to be at a disadvantage with respect to the prior art tone-pair systems, since the tones in a linear system are individually restricted to a level 6 db lower and the composite space group is 3 db lower than a tone pair. However, tests have demonstrated that the system of this invention is still able to perform satisfactorily when the transmitted signal levels are raised to the point where only single tones are within the linear capacity of the communication system. Typically, pairs of tones will then be clipped about 4 db below peak level, the space group of four tones about 10 db, etc. The energy level of individual signals is then least when all are present, but is obviously considerably higher than if they were initially transmitted at a level 10 to 12 db lower to stay within the linear range of the system. Since the clipping will increase with the number of tones, the level of individual tones will vary immediately and widely with combination changes. The unique ability to handle such widely varying signals increases the reliability of the system according to this invention and permits signal levels to be raised to substantial equality with those of a tone-pair system.

Closely related to signal energy and susceptibility to interference is signalling speed or information rate, since both influence the design of the selective responders which limit the speed of response. The practical value of Q found to be necessary in the present system is at least a decade lower than that required in any given set of circumstances by other known systems and this, of course, reflects a corresponding increase in signalling speed.

Flexibility in accommodation to the needs of systems of different sizes is an important factor, but perhaps even more important is the ability to expand an existing system. The present invention provides designs which use only a few standardized functional modules plugged into a mother board, which furnishes the interconnection between modules, to establish a system. It is thus possible to control the number of digits used in a selective calling system by providing a few mother boards embracing two to six digit calls for systems ranging up to a million stations, and hence to enlarge a system by substituting the next larger mother board at each station and adding the modules required for the additional digit. However, as an interim measure, an intermediate stage is available by addition of a tone in each tone generator set, which is particularly economical when all calls are initiated by a few central stations. For example, addition of a tone to a four-tone system provides five unique sets of four tones, one of which is the original set. All existing stations in the system will continue to respond to calls using the four tones of the original, but will ignore calls taken from the other sets even though each tone group will have a mate in another set. This is true for all sets. Hence, the population of stations may be increased by five times, or if two additional tones are used, by thirty times, without increasing the number of digits in a station call. Not only is retrofit of the original set of stations avoided, but also the new stations are fitted for one or two less digits, resulting in some saving of equipment and of channel time devoted to calling.

A further flexibility is evident in that stations may be called in groups having in common the first digit, the first two digits, etc., taken from a common tone set. This is a facility particularly attractive in military operations, traffic control, etc., and is uniquely easy to accomplish in the system of this invention. The flexibility in this respect may obviously be enlarged by adding available tones as set out in the previous paragraph to establish a number of populations of stations within each of which group calls may be made, and possibly include a given station in different order in two or more populations.

A technical advantage arises in systems using a carrier link, since signal frequencies are not restored precisely to their initial values. These minor shifts in frequency can be quite disturbing to systems using highly selective responders such as vibratory reeds but are well within the pass band of the low-Q responders used in the practice of this invention. Similarly, the transmission delay of tone frequencies may be frequency dependent in any transmission link so that sampling for a code character can only be reliably accomplished when adequate time is provided for the tone transmitted with greatest delay. Since the response time of the low-Q resonators in the present system is many times less than the high-Q reeds of prior tone systems, sampling a predetermined time after the end of a space code can provide reliable character recognition at an extremely high keying rate.

In view of the foregoing, the principal object of the present invention is to provide an improved simultaneous tone signalling system capable of higher speed and more reliable operation than heretofore available and with greater versatility than known systems.

Another object of the invention is to provide an improved tone code signalling arrangement which is readily adaptable to various existing types of transmission equipment and is capable of being used for selective calling, data transmission or remote control, or a combination thereof.

The features of the invention which provide the improved operation hereinbefore described as well as further objects and advantages will be apaprent from the following detailed description of a preferred embodiment of the invention taken in conjunction with the accompanying drawing wherein:

FIG. 6 is a schematic wiring diagram of a relay board;

FIG. 7 is a schematic wiring diagram of a compressor amplifier board;

FIG. 12 is a schematic diagram of a lockout flip-flop board;

FIG. 13 is a schematic wiring diagram of a digit or function flip-flop board;

FIG. 18 shows the assembly of FIGS. 5A, B and C to complete FIG. 5.

Figure 1:
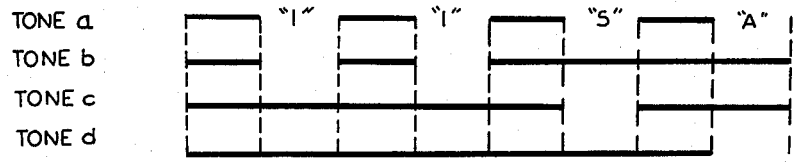
FIG. 1 is a diagram representing the transmission of a four tone code message.

Referring now to FIG. 1, the character of the tone transmission in accordance with the invention will be described for the sequential transmission of the digits 1–1–5 and the letter A. For the purpose of transmission, a suitable minimum error code may be adopted, such as that shown in Table I.

*Table I*

| Character | Code |
|---|---|
| 0 | bcd |
| 1 | cd |
| 2 | a cd |
| 3 | a d |
| 4 | ab d |
| 5 | b d |
| 6 | d |
| 7 | b |
| 8 | ab |
| 9 | abc |
| A | bc |
| B | c |
| C | a c |
| D | a |
| Space | abcd |

The transmission takes place with four distinct tones selected in accordance with the requirements of a particular application and related to one another in a manner to minimize the introduction of harmonic tones which will produce spurious response. The four tones are designated tones $a$, $b$, $c$ and $d$. At the beginning of a transmission, all four tones are transmitted simultaneously as represented by the left-hand portion of FIG. 1. For the transmission of the digit "1," tones $a$ and $b$ are dropped out, leaving tones c and d transmitted. At the end of a character interval the four tones are again transmitted, indicating a space followed by the dropping of tones a and b for the transmission of the second digit "1." At the end of the second character interval the four tones are again transmitted, indicating a space followed by the dropping of tones a and b for the transmission of the second digit "1." At the end of the second character interval the four tones are again transmitted and for the transmission of the character "5," tones a and c are dropped. If the numerical address of a particular station happened to be "115," the transmission of the characters just described would permit a station having such an address designation to respond to the next transmission which could be a functional control transmission made up of a code not used to formulate the digit characters. Thus, if function A were to be performed at station 115, tones a and d could be dropped in the next character interval and the apparatus responsive to function A at station 115 would be operated.

Figure 2:
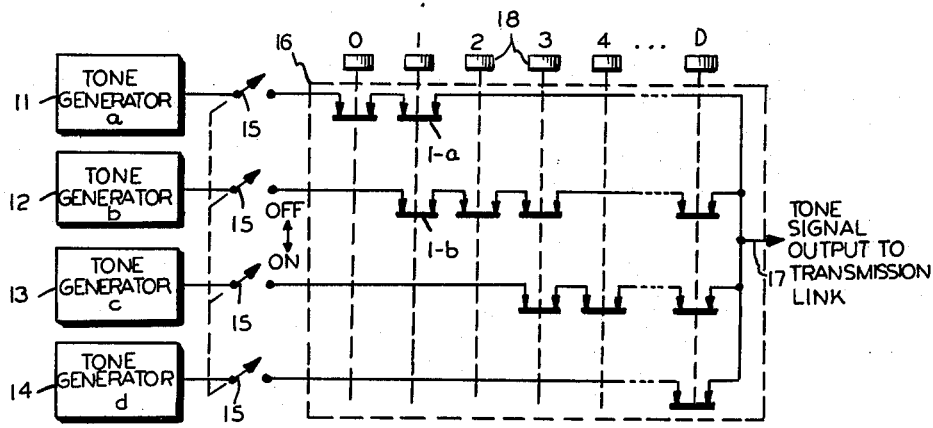
FIG. 2 is a schematic diagram of a simple manual encoder.

In FIG. 2, a simplified manual transmitter for transmitting with a four-tone system is shown. Tone generators 11, 12, 13 and 14 supply, respectively, the tones a, b, c and d. The outputs of the tone generators are applied through on-off switch contacts 15 which may be simultaneously closed to apply the four tones to four inputs of an encoder 16. A simple schematic arrangement of the encoder 16 is indicated whereby the characters as encoded in accordance with the code of Table I are arranged to be produced at output 17 of the encoder 16 whenever the appropriate digit or function switches 18 are depressed. Thus, for transmission of the digit "1" as described with reference to FIG. 1, the push button 18 for the digit "1" is depressed, opening switches 1–a and 1–b for interrupting tones a and b. Similar switch arrangements are provided to be responsive to the digit push buttons 18 and corresponding function push buttons to interrupt the lines corresponding to the tones absent in the code as adopted in accordance with Table I. Thus, by the sequential manipulation of the push buttons 18, any desired digital sequence can be encoded on the line 17 and applied to the transmission link for transmission of the simultaneous tones of each character, with the characters transmitted in sequential fashion to the receiving equipment.

Figure 3:
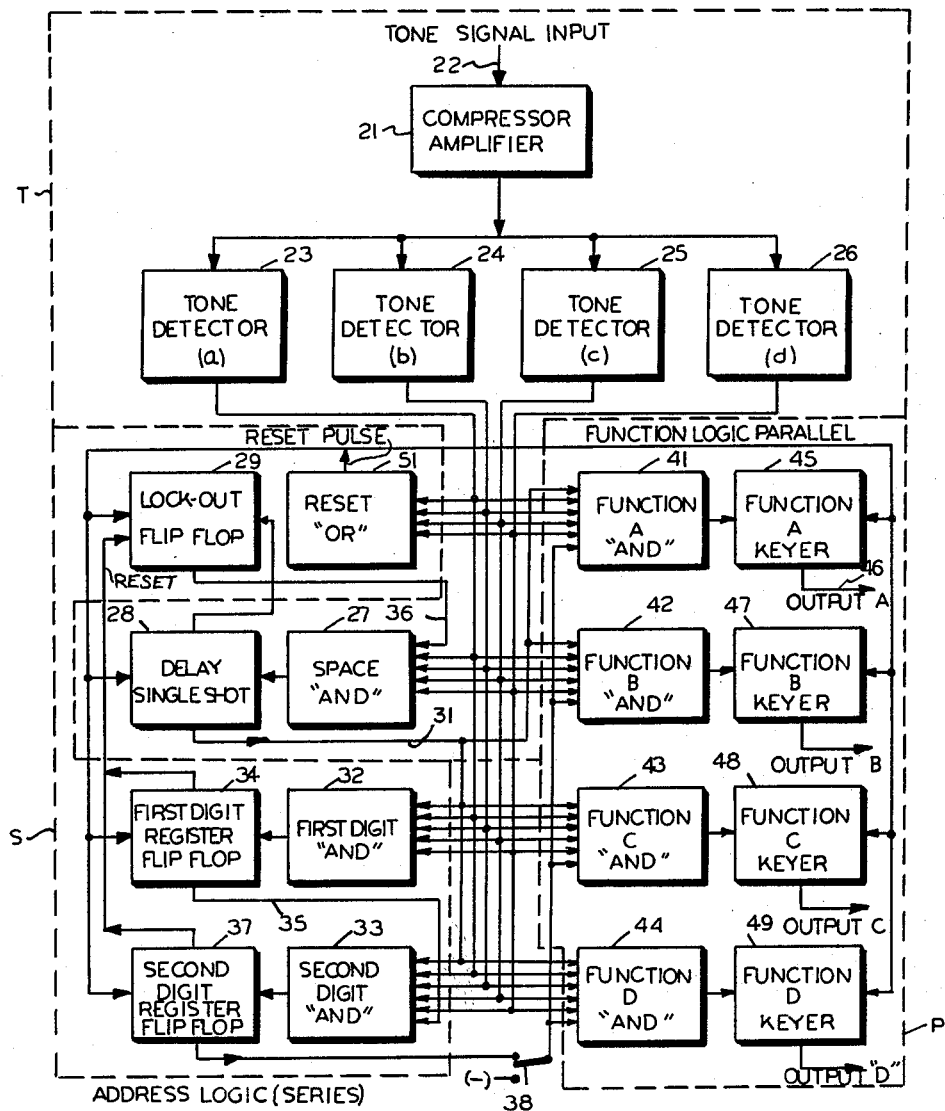
FIG. 3 is a block diagram of a decoder constructed in accordance with the invention.

Referring now to FIG. 3, the decoder equipment at a receiving station comprises a compressor amplifier 21 to which are applied the received or detected simultaneous tone signals at an input 22. The function and operation of the compressor amplifier 21 will be hereinafter described in connection with FIG. 7 and for the present will be considered as merely an amplifier to amplify the tone signals at input 22 and apply the simultaneous tones to a plurality of tone detectors 23, 24, 25 and 26. The tone detectors 23–26 operate to recognize respectively the presence or absence of tones a, b, c and d, and produce an appropriate output corresponding to whether or not that tone is present. For the purpose of the presently disclosed embodiment, the output signals from the tone detectors 23–26 and all subsequent points in the decoder system will be treated as binary logic signals with ground potential being designated a ZERO and with negative potential being designated a ONE. Thus, the presence of a negative potential at the output of tone detectors 23–26 indicates that the absence of the corresponding tone has been detected by the circuit.

The outputs from tone detectors 23–26 are applied to four separate inputs of a space AND circuit 27 which produces a ZERO output only when all input ONE signals thereto are present. If a ONE signal is absent the output of AND 27 is a ONE which triggers a delay single shot 28. The delay single shot 28 produces an output which sets a lockout flip-flop 29 and at the end of the delay interval, which is approximately 10 milliseconds, produces a delayed sampling pulse on line 31.

The absence of one or more of the inputs to space AND circuit 27 produces the input to delay single shot 28 and produces the delayed sampling pulse on line 31 so that sampling a predetermined time after the end of the space code will take place. For this purpose, all outputs of the tone detectors 23–26 are applied to the inputs of address AND circuits 32 and 33. Thus, if the remaining tones after the end of a space correspond to the digit to which AND circuit 32 has been set, the occurrence of the delayed sampling pulse will satisfy the AND inputs of circuit 32 to produce an output to set register flip-flop 34. Prior to the register 34 being set, the AND inputs of the second digit AND 33 cannot be satisfied since one of these inputs is derived from an output of register flip-flop 34 via line 35. The output of flip-flop 34 is also applied to a reset input of the lockout flip-flop 29, thereby establishing the reset condition for flip-flop 29 which satisfies the input to space AND 27 on line 36. Thus, after the end of a space code a delayed sampling pulse is generated which, if it finds that the code of a first digit in address 32 has been satisfied, registers that address digit and resets the lockout flip-flop so that the space AND 27 can be responsive to the occurrence of the next space code. If the first digit AND 32 is not satisfied by the code received, the message is obviously addressed to a station other than the one under consideration, and no digit is registered in flip-flop 34, the lockout flip-flop 29 remains set, and the AND input 36 of space AND 27 remains unsatisfied so that no further response to AND spaces or digit code characters can take place.

If the first digit satisfies AND 32 and lockout flip-flop 29 is reset thereby, the next space code satisfies AND 27 and the termination of the space code produces an output from AND 27 to again trigger delay single shot 28 to produce the delayed sampling pulse on line 31. The delayed sampling pulse on line 31 is applied to inputs in the digit AND's 32, 33 and if the second digit AND 33 is satisfied, including a ONE input on line 35, the sampling pulse on line 31 will produce an output to set a second digit register flip-flop 37. It should be noted that there is no limitation on having first and second digit AND's 32 and 33 wired to recognize the same digit, since if the second digit is the same as the first, AND circuit 32, while being able to recognize it, can produce no useful output since the register 34 has already been set by the first digit. Hence, the two sequential digit flip-flops 32 and 33 can be set for any number between 1 and 99, inclusive, including numbers which contain the same digits such as 11, 22, 33, etc. An output of the second digit register flip-flop 37 is applied to reset the lockout flip-flop 29.

For a two digit address, the output of the register 37 is also applied as an input to function AND circuits 41, 42, 43 and 44. The AND circuits 41–44 have applied as inputs thereto signals representing the presence or absence of the four tones a, b, c and d from the tone detectors 23–26. The final input for the AND's 41–44 is the delayed sampling pulse derived from line 31. Thus, the AND circuits 41–44 are conditioned by the recognition of the correct two-digit address in the AND's 32 and 33 to be responsive to the next code character transmitted which may operate to control a predetermined function. If function A is transmitted corresponding to the code A of Table I, tones b and c will be present in addition to the output of the second digit register 37 and the delayed sampling pulse 31 to satisfy the AND 41 to operate a function flip-flop 45 which when set controls a function in any desired manner at its output lead 46. In similar manner, three separate and distinct other functions can be provided by the AND circuits 42, 43 and 44 being wired to respond to the codes B, C and D respectively and connecting them to set function flip-flops 47, 48 and 49, respectively, whenever the AND 42–44 circuits produce an output signal. At the end of a message transmission, the transmission of all tones is interrupted at the transmitting end and the complete absence of tones causes an OR circuit 51 to supply an output reset pulse to all flip-flops in order that they will be in the proper state for the reception of the next message.

The decoder of FIG. 3 will be recognized as comprising three main elements which will be here identified and later described as they are assembled into basic systems for different communication purposes. The basic tone assembly comprises the compressor amplifier 21, the tone detectors 23–26, the space AND 27 and the delay single shot 28. This portion of FIG. 3 is enclosed within an outline designated T.

The second basic element of FIG. 3 is enclosed within an outline designated S which provides for serial decoding of sequential digits transmitted in accordance with the tone code and continues the decoding process only if the preset digits for a particular station are received in the proper order. Thus, if the station is receiving its proper address, serial decoding continues through the first, second and subsequent digit AND circuits 32, 33 and any additional such AND circuits as may be required for addresses of greater than two digits. Similarly, the corresponding flip-flop registers 33, 37, etc., sequentially register the address and provide for the continued recognition of subsequent digits as long as the correct station address is being received. Whenever the digit sequence received does not correspond to a particular station address, the serial decoding unit S locks up lockout flip-flop 29 and no further serial decoding or recognition of the signal occurs.

The third major unit shown in FIG. 3 is enclosed within the outline labeled P which provides for parallel decoding of digits transmitted after a complete address transmission has been recognized. Thus, four separate and distinct functions in FIG. 3 can be performed in any order and may be used to turn equipment on and off or to provide adjustments in controls in accordance with any predetermined plan by connecting the appropriate controllers to the outputs of the function flip-flops 45–49. It will be noted in parallel decoding that no particular sequence of reception of function signals is required.

Figure 4:
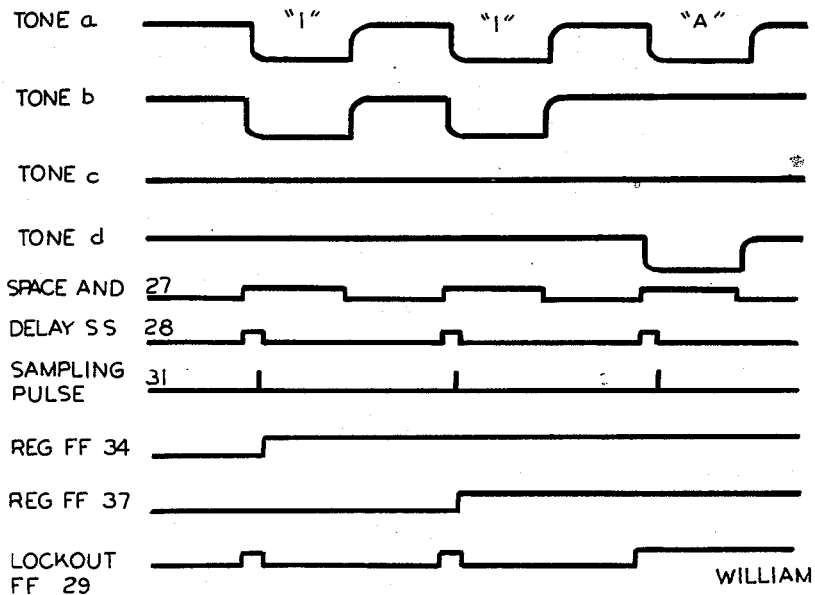
FIG. 4 is a waveform diagram showing operation of the elements of FIG. 3.

Referring now to FIG. 4, the operation of the receiving decoding equipment will be described. A two-digit address equipment such as that shown in FIG. 3 would operate to decode an address of "1—1" and the operation of a function "A" as indicated in FIG. 4. The tones $a$, $b$, $c$ and $d$ are initially all received at the beginning of the message, and tones $a$ and $b$ are dropped out to transmit the first "1." As soon as either tone $a$ or $b$ drops out the space AND 27 produces an output that triggers the delay single shot 28 which after a 10 millisecond interval produces the sampling pulse at line 31. The first "1" is thus registered, as previously described, and as soon as tone pulses $a$ and $b$ are resumed, the space AND 27 is restored to a normal no-output condition. The sampling pulse 31 sets flip-flop register 34 which remains set and the second "1" in the address similarly sets flip-flop register 37. In each instance upon receipt of a digit in the address, the lockout flip-flop 29 is set and reset, but upon the occurrence of the "A" code for function "A," the lockout flip-flop 29 is set but not reset. Hence no further transmissions will be effective relative to the particular receiver having the address "1—1." As long as the function characters, such as A, B, C and D of the code of Table I are restricted to excess codes, that is, combinations which are never used in any address digit, then a decoder which is set to respond to an address of a predetermined number of digits will never respond to a code message either longer or shorter than the prescribed number of digits even though a longer code message may contain the entire three-digit code within itself. To illustrate, let us assume the decoder of FIG. 3 is set to respond to the code 1–1–A as indicated in FIG. 4. Transmission of the code 1–1–1–A will result in the decoder locking out upon receipt of the third digit 1 in the address. Thus, in a system such as described, a two-digit address population of stations may be expanded by adding three-digit decoders for additional stations without any retrofit being required in existing decorder stations.

As another example of the versatility afforded by this signalling method, consider the requirement for group call, and how it can be provided. Referring once again to the decoder block diagram of FIG. 3, it can be seen that the four function outputs 45–49 are prevented from operating unless the second digit register 37 has been set immediately prior to the receipt of the function code. Note that each time the decoder agrees with the received code character, one more sampling pulse will be generated on line 31. In fact, all station decoders generate one sampling pulse corresponding to the first character in every code message. Those that agree with the first character generate a second sampling pulse, and so on. If we merely remove the requirement that the second digit register 37 be set in order to actuate the function codes 41–44 and further stipulate that function code characters be excess codes, that is, not used in any address digit, then we have enabled the decoder to accept the function code at any point in the code message. This can be achieved in FIG. 3 by the provision of switch 37 to interrupt the ONE output line from register 37 and apply a continuous negative voltage to the inputs of AND's 41–44. If we then transmit a single character code message consisting of the function code only, all decoders will perform that function, since all decoders generate the sampling pulse at the end of the first space code in any code message.

By transmitting a two character code message, consisting of an address digit followed by the function code character we will perform the function code only at those decoders which agreed with the first digit, since all decoders set to respond to a first address digit other than that which was transmitted will have locked out on the first part of the code message, and consequently will not generate a sampling pulse for the second character in the message. In this manner, the system is capable of a decade group call. In a five digit address system of selective calling, there is one group of 100,000, ten groups of 10,000, 100 groups of 1,000, 1,000 group of 100, 10,000 groups of ten, and finally, 100,000 unit calls.

It should be pointed out that, as in the preceding case (i.e. serial address), no decoder is capable of responding to a code message which has an excess of address digits. It is, however, necessary that all decoders used within the group call system contain the same number of digits in the address, except in a special case. That case may be illustrated by a typical volunteer fire system, equipped with selective call. Assume that 21 volunteer companies share the same county fire radio system. By using equipment such as described two digit decoders may be assigned to each of the volunteer fire houses for the purpose of sounding the siren, and three digit decoders to each of the volunteer firemen. Decoders supplied to the individual fire company members will bear the same first two digits in their call as the fire house decoder. By transmitting a two digit address and a function code, the siren will be sounded and all members of the company will be group called. By transmitting a three digit address, each individual company member may be selectively called without sounding the siren.

Figure 5A:
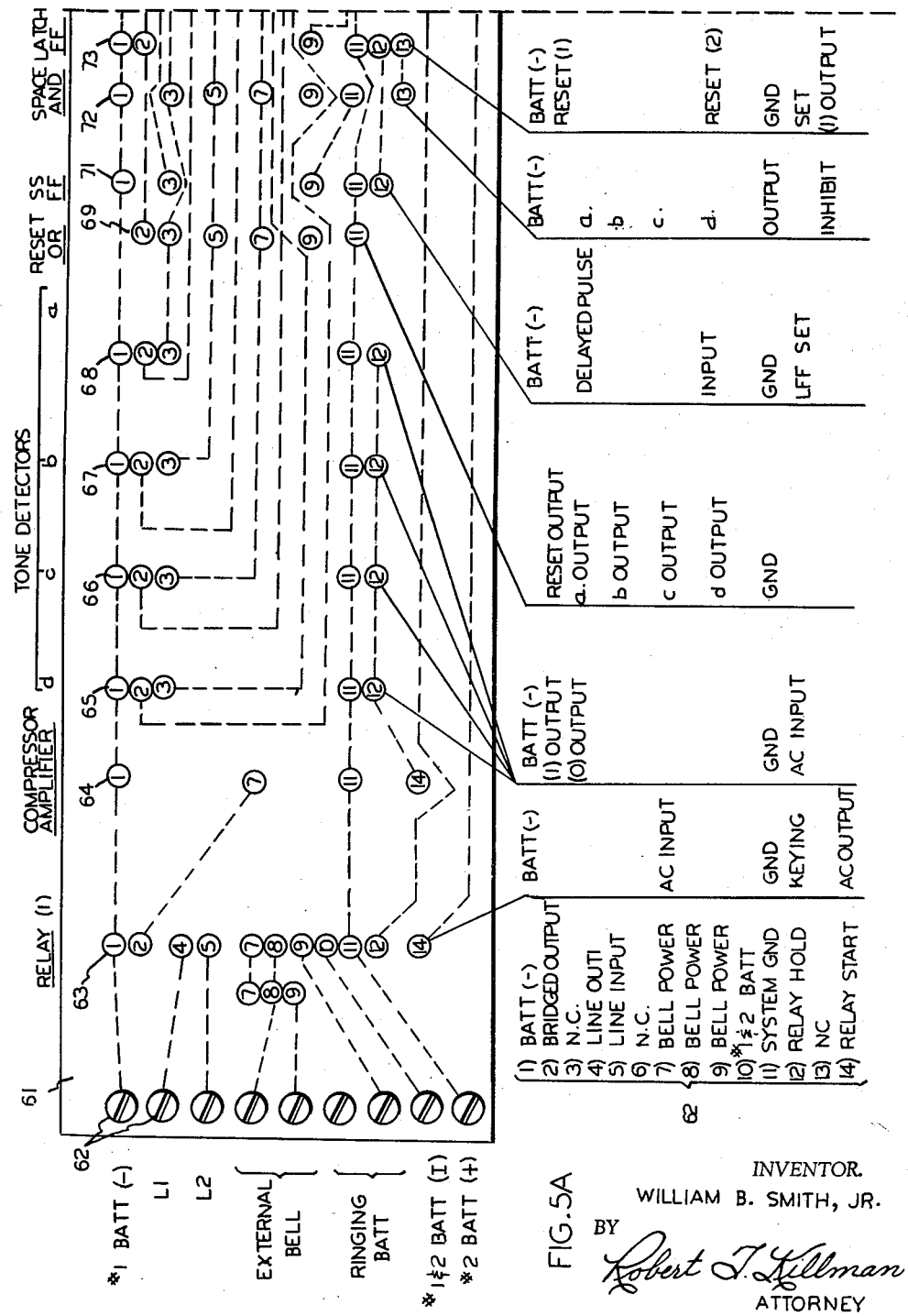
FIGS. 5A to 5C is a layout diagram for a mother board in a printed circuit card embodiment of a particular decoder constructed in accordance with the invention and to which the boards of FIGS. 6–13 are connected.
Figure 5B:
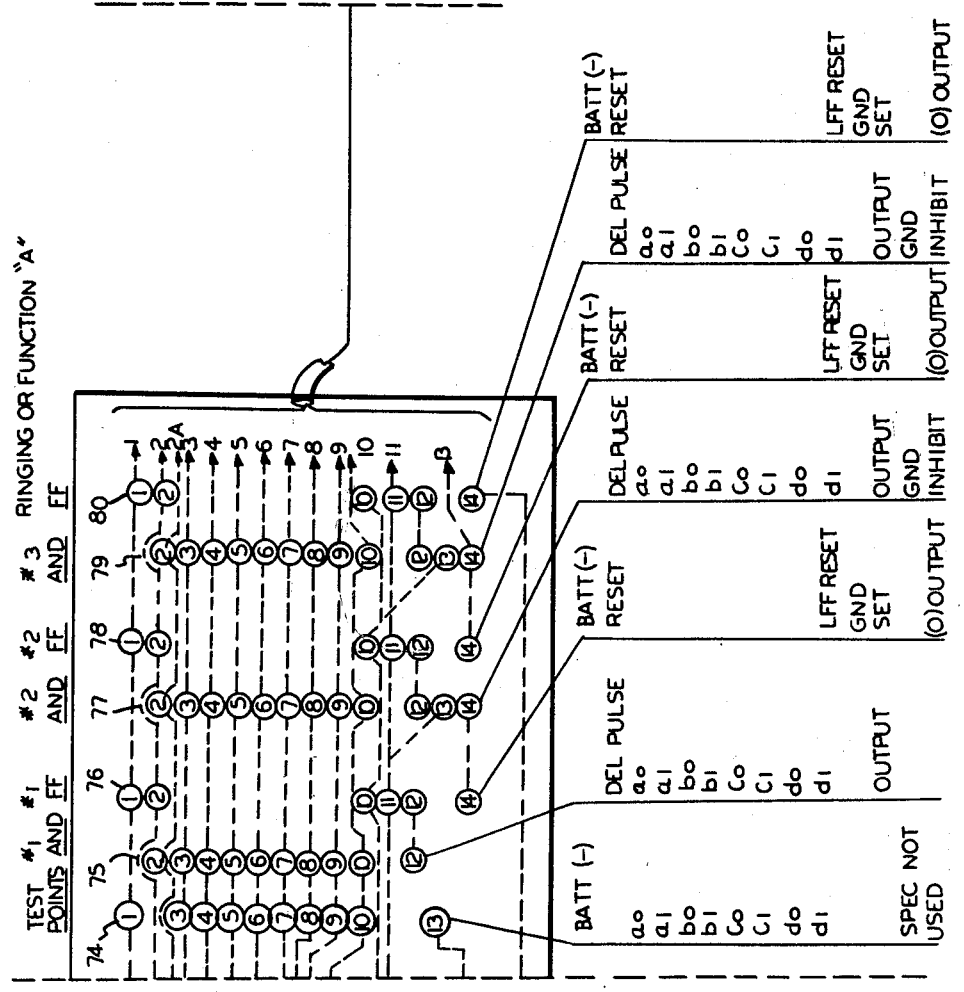
Figure 5C:
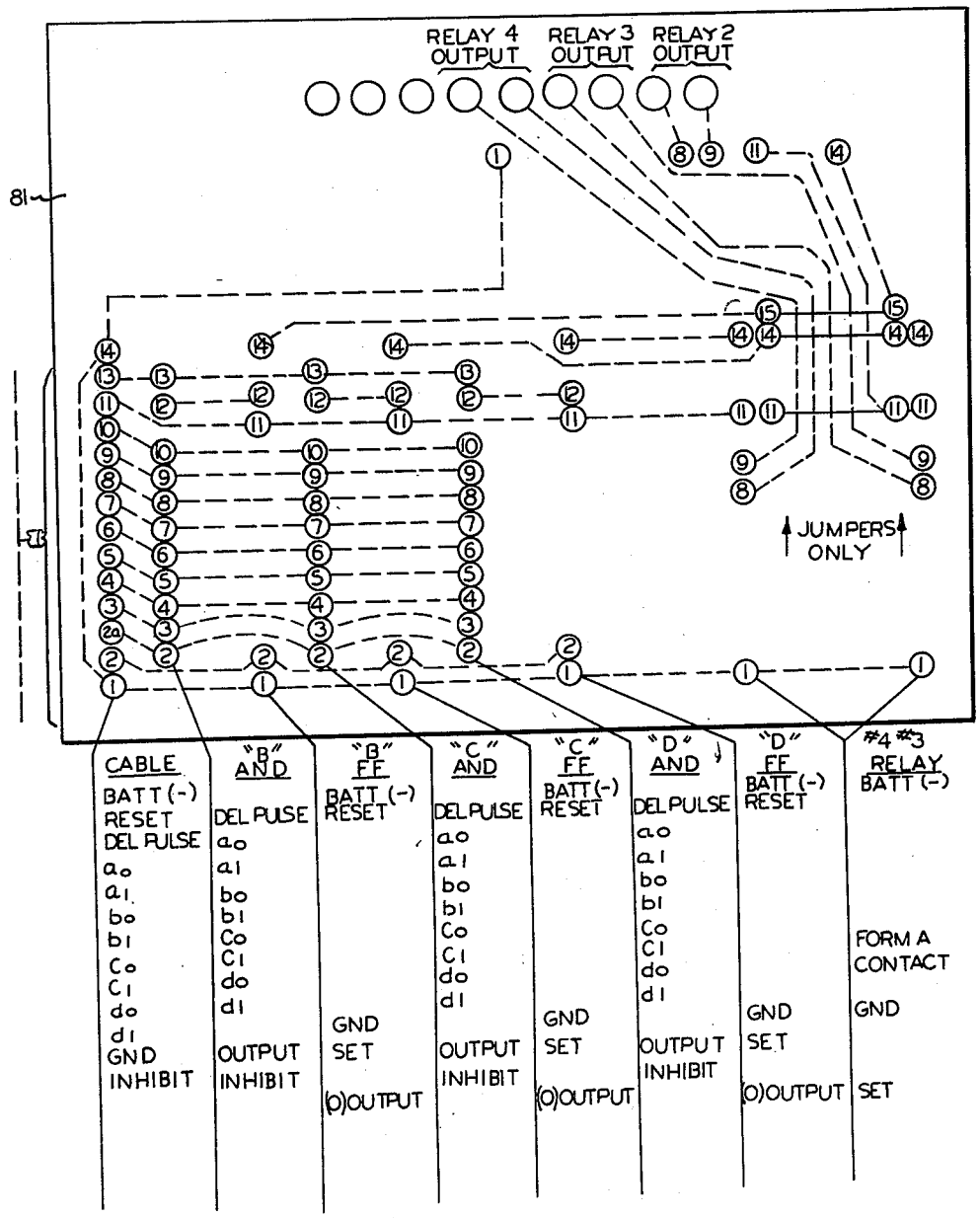

Referring now to FIG. 5, the description of a three digit address four function decoder constructed by printed circuit techniques will be described. FIG. 5 shows the wiring layout of a mother board 61 to which are connected at suitable contact stations the individual printed circuit module boards hereinafter described with respect to FIG. 6 through FIG. 13. The mother board 61 has a plurality of terminals 62 at the left-hand end to which may be made connections to the various sources of power, such as batteries, the line by which the decoder is connected to the transmitter (connected to the terminals 62 labeled L–1 and L–2) and an external bell indicator, as indicated. The mother board 61 has seventeen card stations defined by vertical columns of 14 contacts, some of which may be omitted in any particular column. Each of the columns of contacts is adapted to receive a particular printed circuit board on which is wired a module circuit and the contacts are interconnected by printed type wiring on the board, as indicated by the dotted lines extending between the contacts of the various columns. In the completed assembly with the mother board 61 and the seventeen module boards connected by plug-in connectors to the vertical columns a complete decoder is obtained.

A first column of contacts 63 provides connection for a relay board, and a second column of contacts 64 provides connection for a compressor amplifier board. Columns 65, 66, 67 and 68 provide connection for four tone detector boards which are individually adapted to detect the four tones used in formulating the code characters. A reset OR circuit board is connected to the terminals of column 69, a delay single shot flip-flop board is connected to column 71, a space AND board to column 72, and a lockout flip-flop board is connected to column 73. Test point connections on the surface of the board are provided in column 74. Columns 75 and 76 provide, respectively, the AND and flip-flop board connections for the first address digit, and columns 77 and 78 provide similarly the AND and flip-flop board connections for the second digit of the address. Columns 79 and 80 provide connection for the AND and flip-flop boards in the ringing or "A" function channel. As many additional functions may be provided by repeating columns similar to columns 79 and 80, and these are indicated on an auxiliary board 81, cable-connected to the mother board 61 and providing, in the illustrated case, for three additional functions designated "B," "C" and "D" with an AND circuit and a flip-flop circuit connection column for each function. In FIG. 5, a legend appears below board 61 and board 81 indicating the particular connection made by each connector in each row and column when the module boards are in place. The contact numbers on the schematic diagrams to be described in connection with FIGS. 6 through 13 correspond to the similarly numbered contacts for the particular column to which the module is connected by engaging mating contacts on the module boards and the mother board 61.

The compressor amplifier for connection to contact 64 in FIG. 5 is shown in schematic diagram in FIG. 7.

The input signal is applied through resistor 96 and capacitor 97 to the base of transistor 98, an audio amplifier the output of which is coupled to the base of transistor 99, an emitter follower. The emitter load of transistor 99 is a transistor 101 acting as a variable load resistance. Transistor 101 is fed with an out of phase component of the output signal developed across resistor 102. The net result of this circuit is to yield a very low output impedance source to the tone detectors at terminal 14.

The input signal from terminal 7 is shunted by diodes 103 and 104 which are connected across the power supply through resistors 105, and 106, but have no forward current passing through them since transistor 107 is normally saturated, thereby shunting the current around the two diodes. Transistor 108 serves as a delayed bias detector whose output controls the current through transistor 107. Transistor 108 is normally cut off but as the output of the amplifier, appearing at terminal 14, exceeds the bias level, conduction takes place, reducing the collector voltage, which is biasing transistor 107 in saturation. The reduced bias on transistor 107 increases the voltage developed across the collector emitter thereby forward biasing diodes 103 and 104 in series.

Application of forward bias decreases the dynamic resistance of diodes 103 and 104 thereby shunting the input signal. A further increase in the output will cause a corresponding increase in the forward bias, thereby decreasing the dynamic resistance of the diodes, and increasing their shunting effect. Hence, the output of the amplifier tends to be regulated to a value determined by the delay bias on transistor 108.

Figure 8:
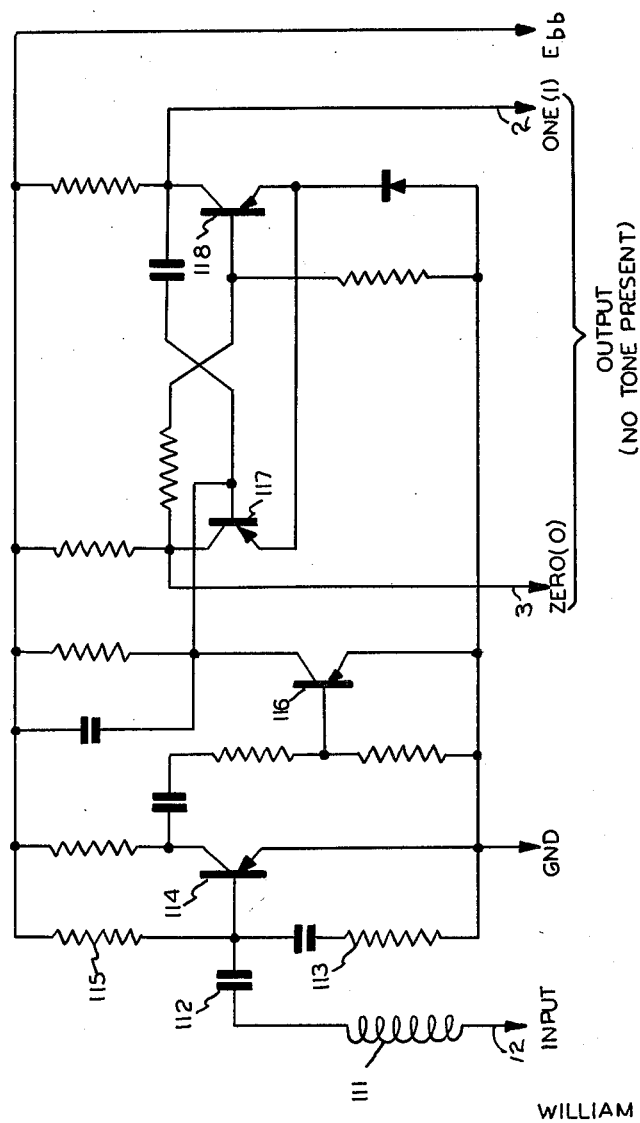
FIG. 8 is a schematic wiring diagram of a tone detector board.

A tone detector is shown in FIG. 8 of the type used for connection to the columns 65, 66, 67 and 68 in FIG. 5. Each tone detector in FIG. 5 will be tuned to detect one of the tones in the simultaneous code group used for transmitting characters. The circuit of FIG. 8 receives input signals from the line via the compressor amplifier of FIG. 7 by connection at terminal 12 through which the signal proceeds to a series one henry inductor 111 and a series capacitor 112. The value of the resonant frequency of the series circuit comprising inductor 111 and capacitor 112 is adjusted by selecting the value of capacitor 112 to obtain the desired tone frequency response. The Q of this resonant circuit is in the range of twenty to thirty as determined by a shunt resistor 113 capacity coupled to the junction of capacitor 112 and the base of a transistor 114. The low Q values used in the present invention are realizable with conventional permeable core inductors and fixed capacitors.

The transistor 114 is biased by resistor 115 to be normally conducting and upon occurrence of a tone signal corresponding to the frequency of circuit 111, 112, positive half cycles of the signal will tend to cut off transistor 114 thereby applying a negative signal to the base of the transistor 116 which is normally nonconducting. This signal produces conduction in transistor 116 to make the collector thereof more positive, which signal is applied to the base of a flip-flop transistor 117 which transistor is normally conducting. The positive signal on the base of transistor 117 causes the transistor to cut off thereby changing the state of the tone detector 117, 118 flip-flop and producing conduction in the other side of the flip-flop transistor 118. The flip-flop transistors 117 and 118 remain in set condition as long as signal is present at the input terminal 12. As soon as the input signal drops to a predetermined level, the flip-flop comprising transistors 117 and 118 reverts to the state in which transistor 117 is conducting and transistor 118 is cut off. With no tone signal present terminal 2, connected to the collector of the normally cut off transistor 118 is approximately at battery potential and is referred to as the ONE output. Terminal 3, connected to the collector of the normally saturated transistor 117 is approximately at ground potential and is referred to the ZERO output.

Figure 9:
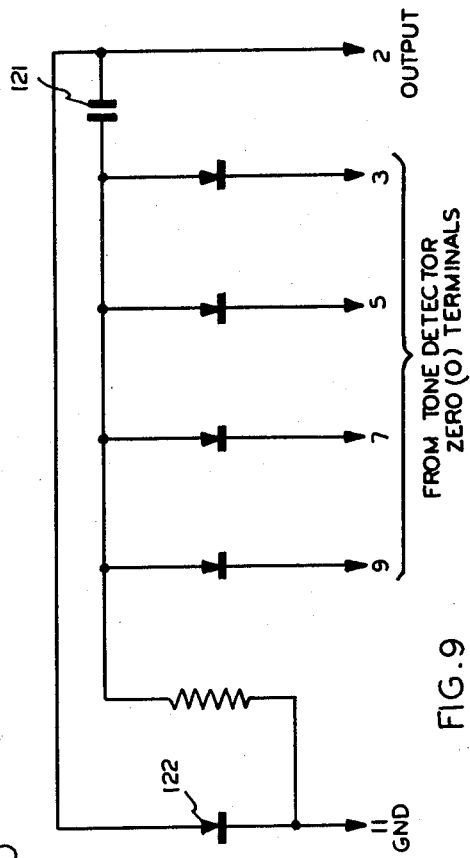
FIG. 9 is a schematic diagram of an OR printed circuit board.

FIG. 9 shows an OR circuit for connection to the terminals in column 69 of FIG. 5. The terminals 3, 5, 7 and 9 are connected to the respective ZERO sides of the flip-flops in the tone detectors, as indicated in FIG. 5, and when the ZERO output of any tone detector flip-flop becomes minus, conduction through one of the diodes produces an output at terminal 2 of FIG. 9. Capacitor 121 and diode 122 differentiate the change of level to produce a negative pulse output at terminal 2.

Figure 10:
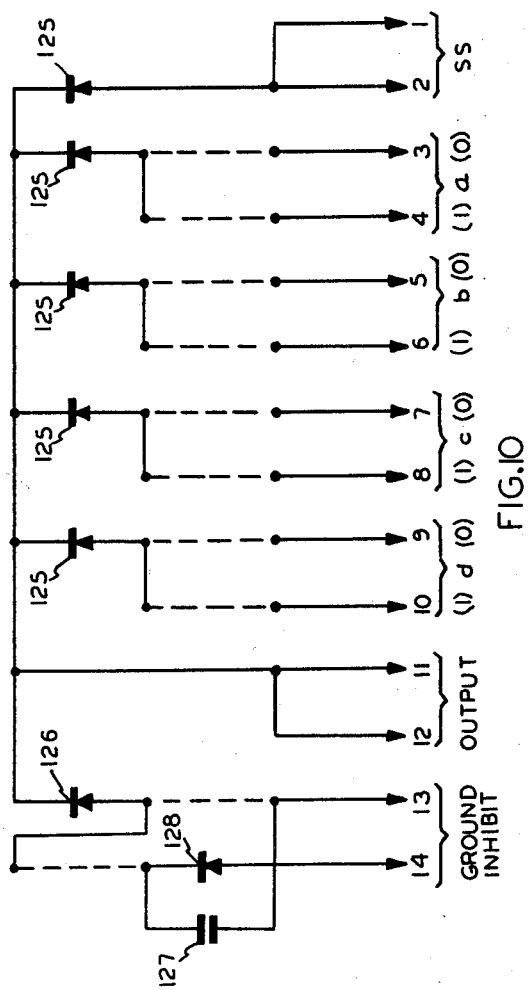
FIG. 10 is a schematic wiring diagram of an AND board.

In FIG. 10, an AND circuit is shown suitable for use as the space AND card in column 72 or any of the other AND circuits, such as columns 75, 77, 79, etc. To make the AND circuit universal, the card is wired with terminals connecting to all of the fourteen terminal points in the mother board of FIG. 5, and terminals 1 through 10 are provided with jumper spaces between the terminals and the associated diodes 125 which are AND connected. By making connection between appropriate jumper terminals, the AND circuits of FIG. 10 can be adapted to respond to any combination of tones present, as indicated by the outputs of the tone detectors to which they are connected by terminals 3 through 10, the latter connection being to both the ZERO and ONE sides of the tone detector flip-flops.

Figure 11:
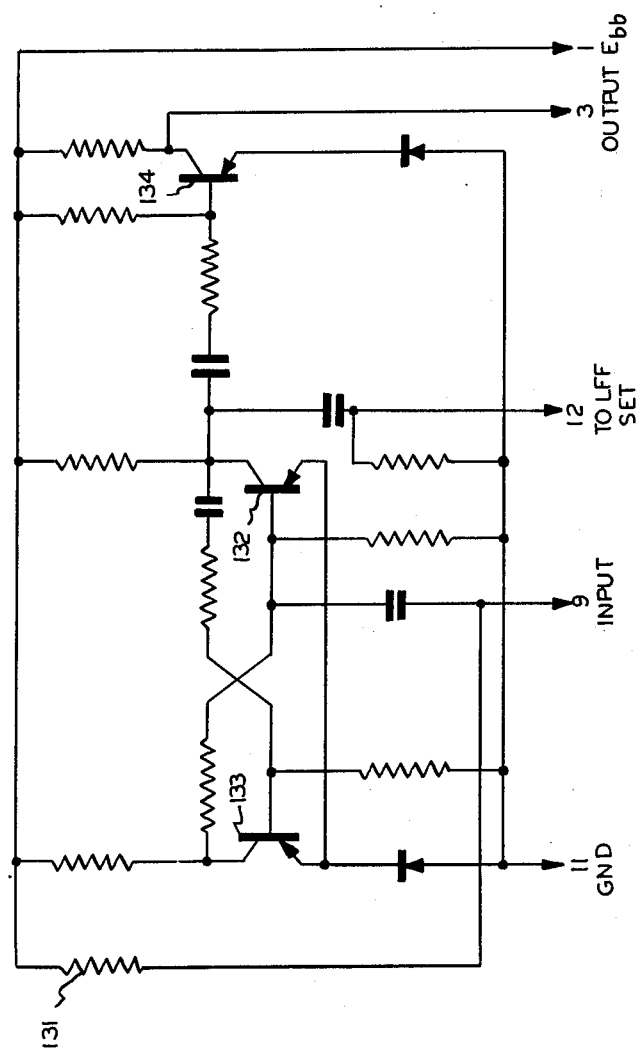
FIG. 11 is a schematic wiring diagram of a single shot flip-flop board.

Terminals 1 and 2 are connected by the mother board to the terminal 3 of FIG. 11 to supply the delayed sample pulse to the AND circuit. When the board of FIG. 10 is used as a space AND, a jumper from diode 126 to terminal 13 provides a ground inhibit potential to the input of the space AND if the lock-out flip-flop 29 is set. When the board is used as a digit AND, a time delay is provided by capacitor 127 and diode 128 which are connected by a jumper to diode 126. Thus terminal 14 which receives an input from the preceding digit flip-flop (via line 35 in FIG. 3, will not respond to this signal until after the sampling pulse has terminated. This provision permits successive use of the same digit in the address.

The circuit of FIG. 10 is connected as a digit AND (32 or 33 of FIG. 3) by appropriate jumpers. For example, to respond to the digit "1" in a code message jumpers would be wired from terminals 4, 6, 7 and 9 of FIG. 10 to the respective diodes 125. The jumper between diodes 126 and 128 is present but may be omitted for the first digit in an address since no inhibition is required.

The circuit of FIG. 10 can be connected as a space AND circuit by connecting the jumpers (indicated by dotted lines) between the terminals of diodes 125 and the board terminals 3, 5, 7 and 9 and the jumper between terminal 13 and diode 126. When plugged into the mother board the FIG. 10 terminals 3, 5, 7 and 9 are connected to the ZERO sides of the corresponding tone detector flip-flops and terminal 13 connects the AND to terminal 13 of the latching flip-flop of FIG. 12. When the latching flip-flop is in set condition its terminal 13 is at ground and no output of the space AND can be obtained regardless of the condition of the tone detectors. Provided the latching flip-flop is in the reset condition when all tones are present, the detector flip-flops maintain terminals 3, 5, 7 and 9 at negative potential thereby maintaining output terminals 11 and 12 at negative potential since none of the diodes 125 conducts and hence there is no drop in resistor 131 of FIG. 11. Whenever any tone disappears the corresponding tone detector flip-flop changes state making the terminals 3, 5, 7 and 9 connected thereto at ground potential and thus producing conduction in the respective diode 125. Conduction through any of the diodes 125 produces a drop in resistor 131 of FIG. 11 so that a positive pulse is applied to the base of transistor 132 in FIG. 11 acting to cut off that transistor and initiate conduction in transistor 133 for a predetermined interval determined by the time constant cross-connection between transistors 133 and 132. The end of the timing interval determined by this time constant causes the flip-flop 132, 133 to revert to its normal state, which time interval is approximately ten milliseconds. Upon reverting to its normal state, transistor 132 conducts, thereby applying a positive signal to the base of transistor 134 which is normally conducting, cutting off transistor 134 and producing a negative output signal at terminal 3 of FIG. 11. A second output is obtained at terminal 12 in FIG. 11 when transistor 132 is cut off, the negative level change at its collector is differentiated in an RC circuit and produces a negative pulse at terminal 12 to set the lockout flip-flop of FIG. 12.

The lockout flip-flop of FIG. 12 comprises a pair of transistors 135, 136 in which transistor 135 is normally cut off and transistor 136 is normally conducting. The negative input on terminal 12 of FIG. 12 from the set output of FIG. 11 causes transistor 135 to conduct and transistor 136 to be cut off, thereby applying a grounding signal output at terminal 13 of FIG. 12. A system reset pulse is applied at terminal 2 of FIG. 12 from the OR circuit of FIG. 9 to reestablish conduction in transistor 136 and cut off transistor 135. A similar reset pulse is applied at terminal 9 from the function digit flip-flop of FIG. 13.

Referring to FIG. 13, a schematic of the function or digit flip-flop circuit is shown. This flip-flop comprises transistors 137 and 138, with the transistor 138 having a reset connection from terminal 2 of the board. The set connection from terminal 12 of the board is applied to the base of transistor 137 and when the flip-flop is set by a negative pulse at terminal 12, transistor 138 becomes conductive making output terminal 13 a ONE or negative level. An output from the ZERO side of the flip-flop is provided at terminal 14, and a reset output to the lock-out flip-flop of FIG. 12 is provided at terminal 10. Thus, the circuit of FIG. 13 on a card with printed wiring and appropriate connectors forms a module suitable for either the digit flip-flop 34 or 37 of FIG. 3 or any of the function flip-flops 45–49. If plural function control is required with a single address transmission the reset output of terminal 10 should be connected between the function flip-flops 45–49 and lock-out flip-flop 29 of FIG. 3.

Figure 14:
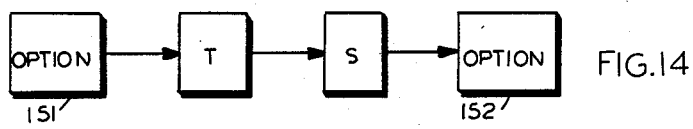
FIG. 14 is a block diagram of a selective calling system application of units constructed in accordance with the invention.

Referring now to FIG. 14, the arrangement of basic units in accordance with the invention to provide simple selective calling is shown. Input signals are received on any optional type equipment 151 which provides a communication link with the transmitting station in accordance with the service to be served. The received tone codes are applied to the basic tone assembly T which corresponds to the elements in unit T of FIG. 3. The tone detector outputs of the assembly T are supplied to a serial decoding unit S which may have one or more digit address units serially connected as shown, for example, in the two-digit address unit S of FIG. 3. The output of the last stage of the serial address unit S is applied to an option equipment 152 of any desired type. For example, the option 152 could be a simple bell alarm or other indicator actuated by the set output of flip-flop 37 of FIG. 3, for example.

Figure 15:
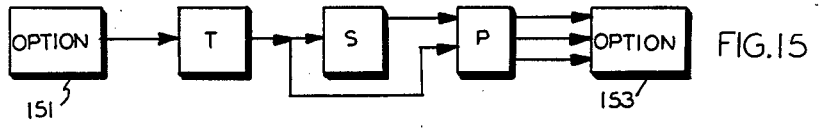
FIG. 15 is a block diagram of an application of the invention to supervisory or automatic control at plural stations with plural functions at each station.

In FIG. 15, the arrangements of the units of the invention to provide supervisory control or automatic control at one of a plurality of stations with plural functions at each station is shown. FIG. 15 corresponds generally to the arrangement of all of the units in FIG. 3, with option 151 providing for the reception of tone code signals in any desired manner. The tone assembly T is effective to operate the serial address decoder S and the outputs of assembly T are also applied to a parallel decoding logic P which is similar to the unit P in FIG. 3. The unit P is capable of controlling a plurality of options 153 in accordance with code signals received after the serial address code has been satisfied to produce an output from unit S to unit P. Thus, a system of stations in accordance with FIG. 15 can be selectively called and the options at each station can be selectively actuated at the selected station.

Figure 16:
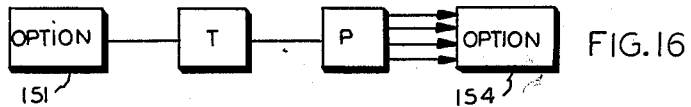
FIG. 16 is a block diagram of the application of the invention to a data transmission system.

FIG. 16 shows an arrangement of the units of the invention for data handling or transmission in which the option 151 supplies tone codes to the tone detector assembly T, the output of which is applied directly to a parallel decoding logic assembly P. The outputs of assembly P are all applied to an option 154 which may have as many options as there are available codes from the number of codes transmitted to the option 151. Thus, for example, option 154 could be an electric typewriter capable of producing a typed readout of the information transmitted into option 151 from the communication link.

Figure 17:
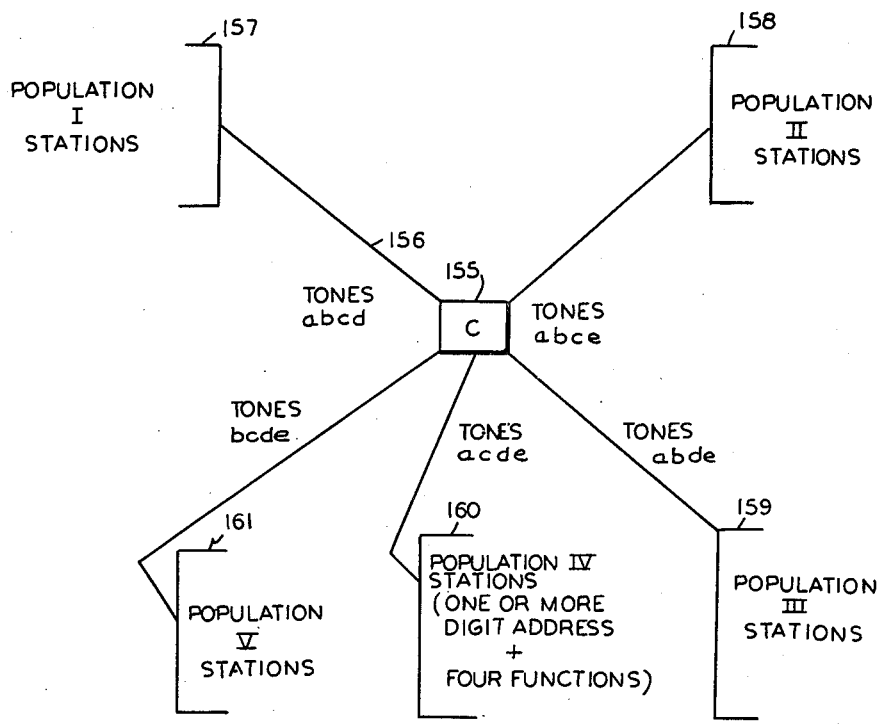
FIG. 17 is a diagram indicating the extension of a four-tone code system to provide a population of five such systems by the addition of a single tone to the four-tone system.

FIG. 17 is a diagram showing how the system of the present invention is capable of expansion to service multiple populations of station groups by the addition of a single tone to an existing four-tone code system. Thus, for example, a central station 155 which has an established communication link 156 with a plurality of stations 157 may operate with a four-tone code $a, b, c, d$ to selectively call any number of stations in the group 157 by a one, two or three or more digit address selective call arrangement. When it is desired to service more stations than can be handled in the group 157 without unduly increasing the number of digits in the address or where a different group of stations is desired to be contacted on an independent basis from the group 157, such additional groups of stations 158, 159, 160, 161 can be accommodated by the addition of a single tone to the available tones at the central station 155. If an additional tone is made available, the station 155 may continue to serve the group of stations 157 without interruption using the tone group $a, b, c, d$. Using the tone group $a, b, c, e$, the station 155 can carry on all corresponding communication functions with the group of stations 158. Similarly, the station 155 can communicate independently with the group of stations 159 using the code group *a, b, d, e,* and with the stations 160 using the code group *a, c, d, e,* and with stations 161 using the code group *b, c, d, e*. It will be noted that the stations in the groups 157–161 will have many characters which are the same. For example, the code *a, b, c* will be significant to the stations 157 and the code *a, b, c* will also be significant to the stations 158. Neither station will respond to calls to other than itself, however, since the space code for each station will be unique and in the absence of receipt of a space code, the basic tone detector assemblies T do not provide for further operation of the digit address equipment S or the parallel function decoders P. Hence a five fold increase in the service capability of the system is obtained by the addition of a single tone capability at the transmitting station without disturbing any existing stations which previously operated with the original four tone code and all five of the populations of stations are capable of independent operation with the central station 155.

The relay keying circuit for connection to contacts 63 FIG. 5, is shown schematically in FIG. 6.

A relay 89 is controlled by current through a transistor 84 which is normally non-conducting. Base current to transistor 84 must flow through transistor 83 which is held in the non-conducting state by a transistor 87 which is conducting as a result of base current flowing through resistor 88 connected to the cut-off collector of transistor 84. A capacitor 86 is charged to a potential which is approximately equal to the supply voltage. Terminal 14, when connected to a flip-flop collector will be approximately at ground or supply voltage dependent upon the state of the flip-flop. When the state of the flip-flop is changed such that the potential at terminal 14 changes from ground to supply voltage, capacitor 90 will charge causing base current to flow in transistor 83, consequently causing base current to flow in transistor 84. Current flow through the transistor 83 will cause a drop in the collector voltage which approaches ground. The charge held by capacitor 86 will cause the base of transistor 87 to be driven into the cut-off region, allowing base current to flow in transistor 83, which in turn allows base current to flow in transistor 84. Current flow through the relay 89 takes place and continues until capacitor 86 has discharged sufficiently to allow transistor 87 to re-enter the conducting state, whereupon the base current to transistor 83 is reduced, causing a consequent rise in the collector voltage, which rise causes the base of transistor 87 to be driven further into conduction, whereupon the circuit has returned to its normal state, i.e. transistor 87 conducting, transistor 83 non-conducting, transistor 84 non-conducting, and the relay de-energized.

Many modifications of the invention will now be apparent to those skilled in the art. The invention is accordingly to be limited only by the scope of the appended claims.

I claim:

1. A code communication system comprising means for simultaneously transmitting a group of distinct frequencies, character transmission means for terminating during a character interval transmission of predetermined combinations of said frequencies corresponding to the respective code representation of each of said characters, means for receiving all frequencies of said group, normally unresponsive means for registering said characters in accordance with said combinations, and means responsive to the termination of reception of one or more but less than all of the frequencies of said group for causing said normally unresponsive means to register said combinations for a predetermined time interval within said character interval.

2. A code communication system for transmitting a sequential series of characters comprising means for simultaneously transmitting a group of distinct frequencies to represent a space code, means for terminating transmission of predetermined combinations of said frequencies corresponding to the respective code representation for each of said characters, means for restoring transmission of said predetermined combinations to transmit said space code after transmission of each intermediate character of said series, receiving means for detecting all of said frequencies, means responsive to the detection of all of said frequencies, and means actuated by said last named means for responding to the absence of one or more but less than all of the frequencies of said group to determine the combination of said frequencies detected by said receiving means a predetermined time after the end of each space code.

3. A code communication system for transmitting and receiving a message composed of a sequential series of characters in which a representation of a space is transmitted between each character comprising means for simultaneously transmitting a plurality of distinct tone frequencies, means for selectively terminating transmission of one or more but less than all of said tone frequencies to form transmitted tone combinations corresponding to a code representation for each of said characters, means for restoring transmission of the terminated tone frequencies to transmit a representation of a space after each of said code representation of characters is transmitted, means for receiving all of said tone frequencies for detecting a representation of a space, means enabled by the detection of a representation of a space for detecting the subsequent reception of said code representation of a character, a register, and means responsive to said detection of a code representation of a character for setting said register a predetermined time after detection of a code representation of a character.

4. In a signaling system in which a group of tones is continuously transmitted at the start of a message and between each character transmission with said characters transmitted as combinations of tones, said combinations being one or more less than all of the tones of said group, a receiver comprising frequency selective means individually responsive to said tones, utilization means operable to register said characters and means coupled to said frequency selective means and operated by the sequence of all of said tones of said group being present followed by the absence of one or more but not all of said tones for operating said utilization means in accordance with the character corresponding to the combination of tones present.

5. A decoder for a tone code communication system in which a group of tones is continuously transmitted at the start of a message and between each character transmission with said characters transmitted as combinations of tones including less than all but more than none of the tones of said group comprising frequency selective means individually responsive to said tones, utilization means operable to register said characters, and means coupled to said frequency selective means and operated by the presence of all of said tones of said group being present followed by the absence of one or more but not all of said tones for sampling for a predetermined time interval to determine the tone combination remaining after said absence is detected and operating said utilization means in accordance with the character corresponding to the remaining tone combination.

6. A code communication system comprising means for simultaneously transmitting a group of distinct tone frequencies, character transmission means for terminating during a character interval transmission of predetermined combinations of said frequencies to form remaining tone combinations corresponding to the respective representation of each of said characters in a code which uses substantially all of said tone combinations including one or more but less than all of said tone frequencies, means for receiving all tone frequencies of said group, normally unresponsive means for decoding said characters in accordance with said tone combinations, and means responsive to the termination of reception of one or more but not all tone frequencies of said group for making said normally unresponsive means responsive to decode said combinations for a predetermined time interval within said character interval.

7. A code communication system for transmitting and receiving a message composed of a sequential series of characters in which a representation of a space in transmitted between each character comprising means for simultaneously transmitting a plurality of distinct frequencies, means for selectively terminating transmission of combinations greater than none but less than all of said frequencies corresponding to a code, in which are represented by combinations of different numbers of said frequencies, means for restoring transmission of all of said frequencies after each of said characters is transmitted as one of said combinations, means for receiving all of said frequencies, means enabled by the reception of all of said frequencies for detecting the subsequent termination of any of said frequencies, a register, and means responsive to said detection of termination of any of said frequencies for setting said register in accordance with the received tone combination present at said receiving means a predetermined time after said termination of any of said frequencies.

8. A decoder comprising a plurality of distinct tone detectors each producing first and second output signals corresponding respectively to the presence or absence of an input at the tone frequency of the respective detectors, means coupled to receive said output signals and conditioned by the presence of said first output signals from all of said detectors to produce a third signal in response to the transition of any of said first signals to said second signals, means responsive to said third signal for generating a delayed sampling signal, and register means responsive to said first and second output signals and said delayed sampling pulse for determining the combination of said tones present during said sampling signal.

9. Apparatus according to claim 8 in which said register means comprises a plurality of successive stages adapted to respond to the successive characters of the address of a particular decoder station and each of said stages subsequent to the first stage being conditioned to respond only if the next preceding stage has registered the character to which it is adapted.

10. Apparatus according to claim 9 and including lock-out means operable to enable and disable said third signal producing means, means responsive to said third signal for operating said lock-out means to disable said third signal producing means, and means coupling said lock-out means to be operated by said register means to enable said third signal producing means in response to registering a character in each stage of said register.

11. Apparatus according to claim 9 and including a plurality of function circuits connected to respond to predetermined combinations of said first and second signals and said delayed sampling signal.

12. Apparatus according to claim 11 in which said function circuits are conditioned to respond only if the last stage of said register means has registered the character to which it is adapted.

13. A decoder comprising a plurality of distinct tone detectors having first and second output states corresponding respectively to the presence and to the absence of an input at the tone frequency of the respective detectors, an AND circuit coupled to be enabled by all of said outputs simultaneously being in the first of said states, a delay single-shot for generating a delayed sample pulse coupled to be triggered by said AND, a first digit AND coupled to be enabled by a predetermined combination of outputs from said tone detectors plus said delayed sample pulse, a first digit register flip-flop coupled to be set by the enablement of said first digit AND, a second digit AND coupled to be enabled by a predetermined combination of outputs from said tone detectors plus said delayed sample pulse plus a set output of said first digit flip-flop, a second digit register flip-flop coupled to be set by the enablement of said second digit AND, and utilization means coupled to the output of said second digit register flip-flop.

14. A plural function controller comprising a plurality of distinct tone detectors, means for coupling simultaneous distinct tone code signals to said detectors, means enabled by the detection of all of said distinct tones for detecting the subsequent termination of any of said tones, means responsive to said detection of termination of any of said tones for producing a delayed enabling pulse, and a plurality of function control circuits each arranged to respond to the detection of a different predetermined combination of said tones, one of said control circuits being actuated according to the tone combination present at the time of said enabling pulse.

References Cited by the Examiner
UNITED STATES PATENTS
2,470,145   5/49   Clos _____ 340—171

NEIL C. READ, *Primary Examiner.*